United States Patent
De'Longhi et al.

(10) Patent No.: US 10,610,046 B2
(45) Date of Patent: Apr. 7, 2020

(54) HIGHLY FLEXIBLE USE AUTOMATIC COFFEE MACHINE

(71) Applicant: De'Longhi Appliances S.R.L., Treviso (IT)

(72) Inventors: Giuseppe De'Longhi, Treviso (IT); Paolo Evangelisti, Bologna (IT)

(73) Assignee: De'Longhi Appliances S.R.L., Treviso (IT)

( * ) Notice: Subject to any disclaimer, the term of this patent is extended or adjusted under 35 U.S.C. 154(b) by 652 days.

(21) Appl. No.: 14/649,256

(22) PCT Filed: Nov. 25, 2013

(86) PCT No.: PCT/EP2013/074557
§ 371 (c)(1),
(2) Date: Jun. 3, 2015

(87) PCT Pub. No.: WO2014/086602
PCT Pub. Date: Jun. 12, 2014

(65) Prior Publication Data
US 2015/0342396 A1 Dec. 3, 2015

(30) Foreign Application Priority Data
Dec. 4, 2012 (IT) .............................. MI2012A2069

(51) Int. Cl.
*A47J 31/46* (2006.01)
*A47J 31/44* (2006.01)

(52) U.S. Cl.
CPC ............ *A47J 31/46* (2013.01); *A47J 31/4485* (2013.01)

(58) Field of Classification Search
CPC .............................. A47J 31/46; A47J 31/4485
(Continued)

(56) References Cited

U.S. PATENT DOCUMENTS 5,158,793 A * 10/1992 Helbling ............... A47J 31/007
426/231
6,959,642 B1 * 11/2005 Landolt ................... A47J 31/60
99/290
(Continued)

FOREIGN PATENT DOCUMENTS

EP 2130466 12/2009
FR 583474 1/1925
(Continued)

OTHER PUBLICATIONS

International Search Report dated Feb. 27, 2014; International Application No. PCT/EP2013/074557; International Filing Date: Nov. 25, 2013; 4 pages.
(Continued)

*Primary Examiner* — Ibrahime A Abraham
*Assistant Examiner* — Biniam B Asmelash
(74) *Attorney, Agent, or Firm* — Blank Rome LLP (57) ABSTRACT

The automatic coffee machine (1) comprises a single infuser unit (2) for producing a coffee infusion, coffee infusion dispensing means (4) located in front of a front wall (5) of the machine (1) in a distanced position above a surface (6) for resting one or more cups (7, 8) for collecting the coffee infusion, a hydraulic circuit (9) for distributing the coffee infusion to the coffee infusion dispensing means (4), and valve interception means (10) present along said hydraulic circuit (9), the coffee infusion dispensing means (4) comprise a first coffee infusion dispensing unit (16) equipped with at least one coffee infusion dispensing nozzle (17, 18) and at least a second coffee infusion dispensing unit (19) equipped with at least one coffee infusion dispensing nozzle (20, 21), the hydraulic circuit (9) comprising a first supply pipe (34) for said first coffee infusion dispensing unit (16) and a second supply pipe (35) for said second coffee infusion dispensing unit (19), said valve means (10) comprising a
(Continued)

first interception valve (36) of the flow along said first pipe (34) and a second interception valve (37) of the flow along said second pipe (35).

16 Claims, 7 Drawing Sheets

(58) Field of Classification Search
USPC ...... 99/300, 284, 290, 291, 293, 298, 302 R
See application file for complete search history.

(56) References Cited

U.S. PATENT DOCUMENTS 8,007,599 B2 * 8/2011 Coccia .................... A47J 31/60
134/166 C
2009/0092728 A1 * 4/2009 Coccia ................ A47J 31/4485
426/569
2009/0095163 A1 * 4/2009 Sala ...................... A47J 31/402
99/284

FOREIGN PATENT DOCUMENTS

WO    WO2011064702    6/2011
WO    WO2011095378    8/2011

OTHER PUBLICATIONS

Written Opinion dated Feb. 27, 2014; International Application No. PCT/EP2013/074557; International Filing Date: Nov. 25, 2013; 3 pages.
English translation; French Patent Application No. FR583474; 4 pages.

* cited by examiner

HIGHLY FLEXIBLE USE AUTOMATIC COFFEE MACHINE

The present invention relates to an automatic coffee machine for domestic or professional use.

It is known that automatic coffee machines have an infuser unit able to feed a plurality of dispensing nozzles of the coffee drink.

In some types of automatic coffee machines there is also a device for the production of hot milk, potentially frothy, to be added in the cup to the coffee drink for making a cappuccino or a latte macchiato or a white coffee. Such a device is generally associated in a removable way with the vapour dispenser normally present in automatic coffee machines.

Such coffee machines of the prior art can complain of limited user flexibility due to the fact that different drinks cannot be prepared simultaneously and they are consequently not particularly suitable for correctly handling simultaneous requests of various users. This can naturally have a negative effect on their production capacity.

The technical task of the present invention is, therefore, to provide an automatic coffee machine which obviates the above-described technical drawbacks of the prior art.

Within the context of this technical task, an object of the invention is to provide an automatic coffee machine suitable for fulfilling the requests of various users simultaneously.

A further object of the present invention is that of providing an automatic coffee machine having a highly flexible use for optimising the production capacity also for requests for different drinks from various users simultaneously.

Another object of the invention is to provide an automatic coffee machine having a single infuser unit so as to be constructively simple, compact and cheap.

The technical task, as well as these and other objects, according to the present invention, are reached by providing an highly flexible use automatic coffee machine for producing coffee and/or milk based drinks, comprising a single infuser unit for producing a coffee infusion, coffee infusion dispensing means located in front of a front wall of the machine in a distanced position above a surface for resting one or more cups for collecting the coffee infusion, a hydraulic circuit for distributing the coffee infusion to the coffee infusion dispensing means, and valve interception means present along said hydraulic circuit, characterised in that said coffee infusion dispensing means comprise a first coffee infusion dispensing unit equipped with at least one coffee infusion dispensing nozzle and at least a second coffee infusion dispensing unit equipped with at least one coffee infusion dispensing nozzle, said hydraulic circuit comprising a first supply pipe for said first coffee infusion dispensing unit and a second supply pipe for said second coffee infusion dispensing unit, said valve means comprising a first interception valve of the flow along said first pipe and a second interception valve of the flow along said second pipe.

Further characteristics of the present invention are also defined in the following claims.

Further characteristics and advantages of the invention will more fully emerge from the description of a preferred but not exclusive embodiment of the automatic coffee machine according to the invention, illustrated by way of non-limiting example in the accompanying drawings, in which.

With reference to the figures mentioned, a coffee machine is shown indicated overall with the reference number 1.

The automatic coffee machine 1 comprises a single infuser unit 2 for the production of a coffee infusion, a hydraulic circuit 3 for the supply of hot water to the infuser unit 2, coffee infusion dispensing means 4 located in front of a front wall 5 of the machine 1 in a distanced position above a surface 6 for resting one or more cups 7, 8 for collecting the infusion, a hydraulic circuit 9 for distributing the infusion to the infusion dispensing means 4, and valve interception means 10 present along said hydraulic circuit 9 for distributing the coffee infusion.

Figure 1:
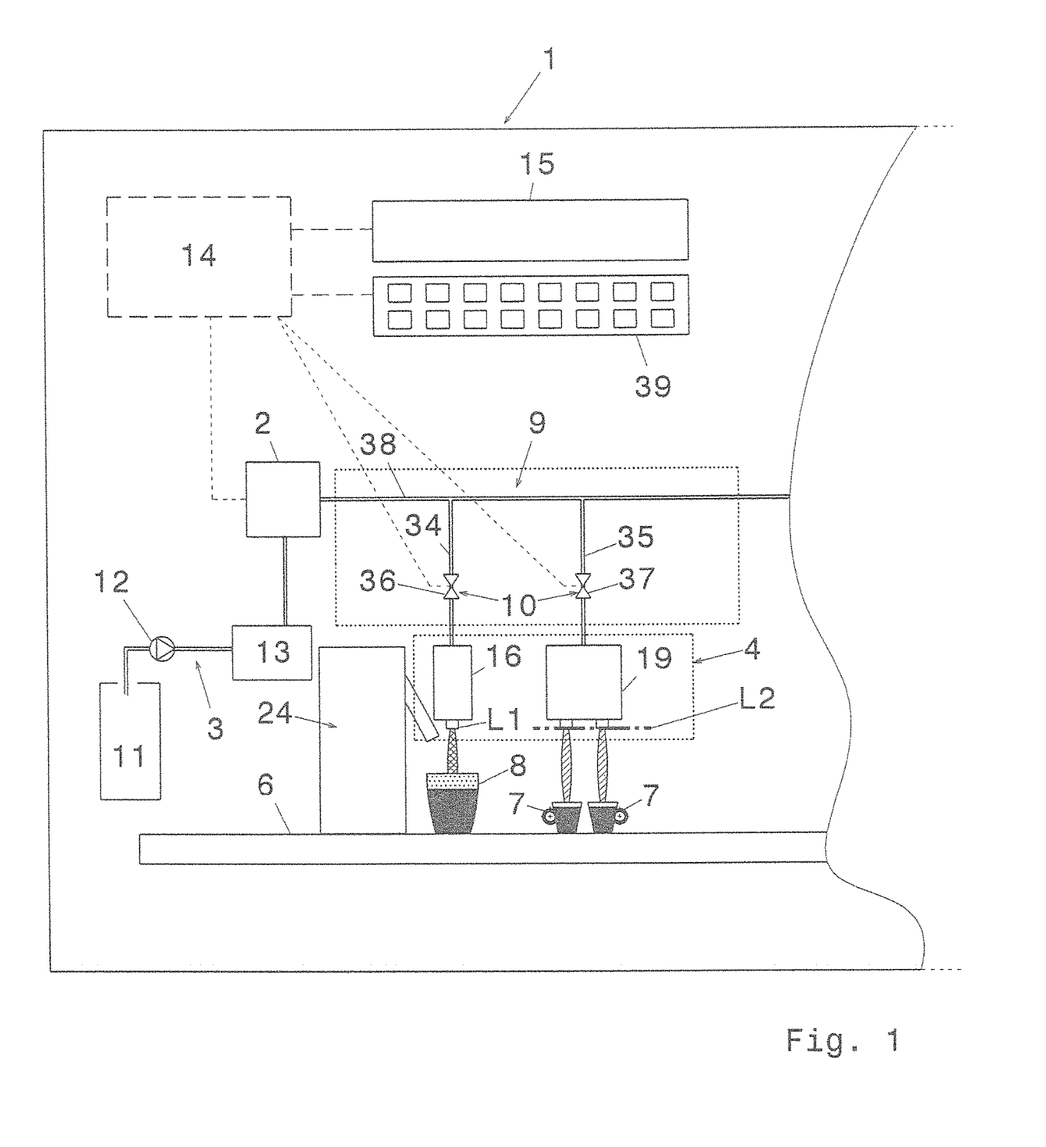
FIG. 1 shows a diagram of the hydraulic circuit of the coffee machine.

The hydraulic circuit 3 for supplying hot water comprises, in turn, a water tank 11, a circulation pump 12 and a boiler 13.

The boiler 13 and the circulation pump 12 are suitable for supplying the infuser unit 2 with infusion water at a temperature comprised between 75° C. and 80° C. and pressure comprised between 8 bar and 12 bar.

The machine 1 further comprises an electronic controller 14 to which the infuser unit 2, the circulation pump 12, the boiler 13, the valve interception means 10, a programming unit 39, for example a pushbutton panel, and a user interface unit 15, for example a display panel, are connected.

The machine 1 is preferably of the type in which the loading and unloading of the coffee into and out of the infuser unit 2 is also performed completely automatically by exploiting mechanisms of the prior art that are activated automatically, for example, when the infuser unit 2 opens and closes.

The dispensing means 4 of the coffee infusion comprise a first dispensing unit 16 of the infusion equipped with at least one dispensing nozzle and preferably a first dispensing nozzle 17 of the infusion and at least a second dispensing nozzle 18 of the infusion.

The dispensing means 4 of the infusion further comprise a second dispensing unit 19 of the infusion equipped with at least one dispensing nozzle and preferably a third dispensing nozzle 20 of the infusion and at least a fourth dispensing nozzle 21 of the infusion.

The hydraulic circuit 9 for distributing the coffee infusion has a first preferably flexible supply pipe (hose) 34 for the first dispensing unit 16 of the coffee infusion and a second preferably flexible supply pipe (hose) 35 for the second dispensing unit 19 of the coffee infusion.

The first hose 34 and the second hose 35 are supplied by a single manifold 38 connected to the outlet of the coffee infusion from the infusion unit 2.

Preferably the first hose 34 and the second hose 35 have the same through section. The valve means 10 comprise a first valve 36 preferably of the pipe-clamping type applied to the first hose 34 and a second valve 37 also preferably of the pipe-clamping type applied to the second hose 35.

The first dispensing unit 16 and the second dispensing unit 19 are positioned in front of a central area of the front wall 5 of the machine.

The first dispensing nozzle 17 and the second dispensing nozzle 18 are fixed to a single support 22 assembled in a cantilever fashion in front of the front wall 5 of the machine 1 and extend below the support 22 itself.

The first dispensing nozzle 17 and the second dispensing nozzle 18 are separated from each other by an established distance and are aligned along a first alignment direction L1.

The support 22 has an internal channel (not shown) configured to equally distribute the flow of the coffee infusion between the first and second coffee infusion dispensing nozzles 17, 18.

The third dispensing nozzle 20 and the fourth dispensing nozzle 21 are fixed to a single support 23 assembled in a cantilever fashion in front of the front wall 5 of the machine 1 and to the side of the support 22, and extend below the support 23 itself.

The third dispensing nozzle 20 and the fourth dispensing nozzle 21 are separated by an established distance and are aligned along a second alignment direction L2.

Preferably, as illustrated in the specific embodiment, the second alignment direction L2 is transversal to the first alignment direction L1.

Preferably the first alignment direction L1 develops parallel to the depth direction of the machine 1 whereas the second alignment direction L2 develops in the direction of the width of the machine 1.

The support 23 has an internal channel (not shown) configured to equally distribute the flow of the coffee infusion between the third and fourth coffee infusion dispensing nozzles 20, 21.

The support 22 and the support 23 are adjustable in position independently from each other in the direction of the height of the machine 1 in order to allow the positioning of cups 7 for coffee or taller cups 8 for coffee and milk based drinks below the first coffee infusion dispensing unit 16 and the second coffee infusion dispensing unit 19.

In front of the front wall 5 of the machine and to the side of the first dispensing unit 16, on the opposite side thereof to that adjacent to the second dispensing unit 19, there is a space for positioning a heating and milk frothing device 24 on the support surface 6.

The device 24 has a milk container 25 of the prior art equipped with a lid 26 and a manifold body (not shown) having an internal cavity accessed by a vapour inlet conduit supplied by a vapour dispenser 27 envisaged at the front wall 5 of the machine 1, a Venturi effect suction conduit of the milk contained in the container, an air suction conduit, and a connection conduit 28 to a dispenser unit 29 of the heated and emulsified milk.

The manifold body 3 may be supported by the lid 26 of the container 25.

The device 24 is also equipped in a known way with a regulation knob 32 of the opening of the air suction conduit for regulating the frothing of the milk.

The device 24 is associated in a removable way with the machine 1 through the connection of the vapour inlet conduit to the vapour dispenser 27 of the machine 1 itself.

The milk dispenser unit 29 is equipped with at least one dispensing nozzle and preferably a first milk dispensing nozzle 30 and at least a second milk dispensing nozzle 31 which, when the device 24 is associated with the machine 1, are located in a distanced position above the support surface and are oriented, just like the first coffee infusion dispensing nozzle 17 and the second coffee infusion dispensing nozzle 18, towards the space above the first coffee infusion dispensing unit 16.

Figure 7:
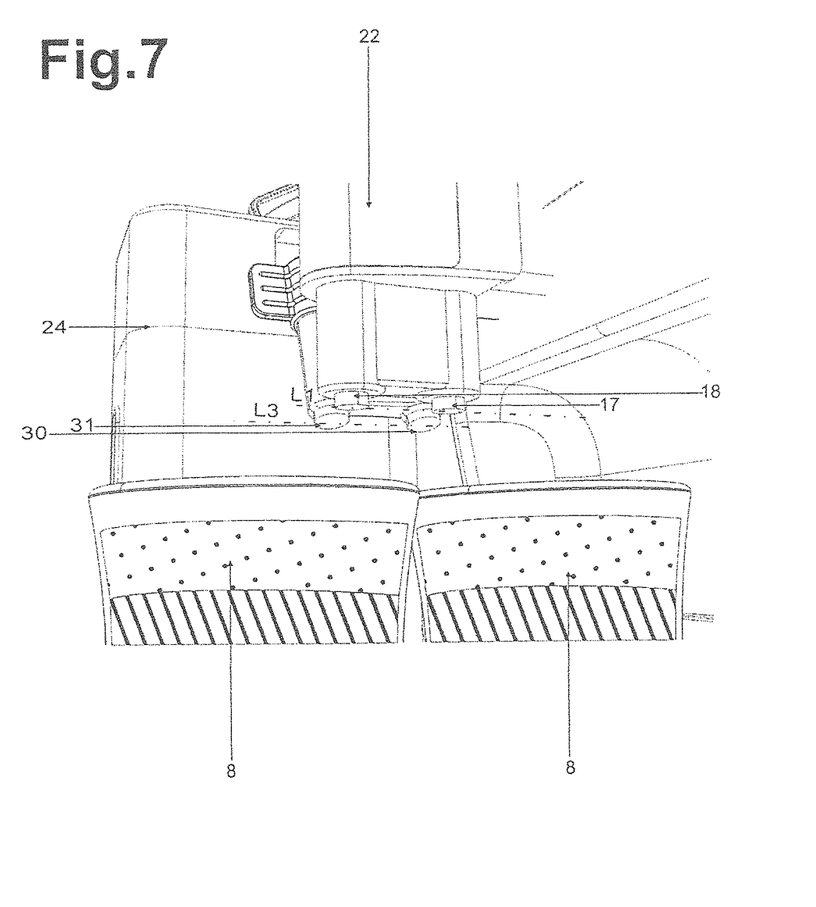
FIG. 7 shows an enlarged detail in perspective view from below of the milk dispensing unit of FIG. 6.

The first milk dispensing nozzle 30 and the second milk dispensing nozzle 31 are separated by an established distance, and are fixed to a single support 33 in turn fixed to the milk dispensing conduit 28.

The support 33 has an internal channel (not shown) configured to equally distribute the flow of the coffee infusion between the first and the second milk dispensing nozzles 30, 31.

The first milk dispensing nozzle 30 and the second milk dispensing nozzle 31 are further aligned along a third alignment direction L3 preferably parallel to the first alignment direction L1.

The first, second, third and fourth coffee infusion dispensing nozzles 17, 18, 20, 21 have an infusion dispensing axis which is rectilinear and orthogonal to the support surface 6 of the cups 7, 8, while the first and second milk dispensing nozzles 30, 31 have a rectilinear milk dispensing axis which is inclined with respect to the support surface 6 of the cups 7, 8.

Preferably the dispensing axis of the first coffee infusion dispensing nozzle 17 and the first milk dispensing nozzle 30 are arranged on a single vertical lying plane parallel to the direction of the width of the machine 1, just as the dispensing axis of the second infusion dispensing nozzle 18 and the dispensing axis of the second milk dispensing nozzle 31 are arranged on a single vertical lying plane parallel to the direction of the width of the machine 1.

The operation of the machine 1 is as follows.

The special arrangement of the dispensing units 16, 19 and 29 allows a highly flexible use of the machine 1 even with the use of a standard infuser 2 commonly available on the market, having the maximum dispensing capacity of two doses of coffee drink.

The machine 1 in this circumstance may be programmed to operate with a single infusion for the preparation of one or two drinks or with two consecutive infusions for the preparation of four drinks.

The machine 1 may be programmed to operate in traditional mode with a single infusion for the preparation of one or two of the same coffee drinks.

In order to prepare a single coffee drink the user positions a cup 7 below a dispensing unit 16 or 19 so that the axial extension of both nozzles 17, 18 or 20, 21 projects into the mouth of the cup 7, and performs the selection on the programming unit 39; at this point the control unit 14 controls the half loading of the infuser unit 2, the closure of the infusion unit 2, the activation of the pump 12 and the boiler 13 for supplying a pre-established quantity of hot water to the infusion unit 2, and the temporary opening of the valve 36 or the valve 37.

In order to prepare two of the same coffee drinks simultaneously with a single infusion the user positions two cups 7 below a dispensing unit 16 or 19 so that the axial extension of each nozzle 17, 18 or 20, 21 projects into the mouth of the cup 7, and performs the selection on the programming unit 39; at this point the control unit 14 controls the full loading of the infuser unit 2, the closure of the infusion unit 2, the activation of the pump 12 and the boiler 13 for supplying a pre-established quantity of hot water to the infusion unit 2, and the temporary opening of the valve 36 or the valve 37.

The machine 1 can however be programmed to operate with a single infusion for the preparation of two different drinks.

Figure 3:
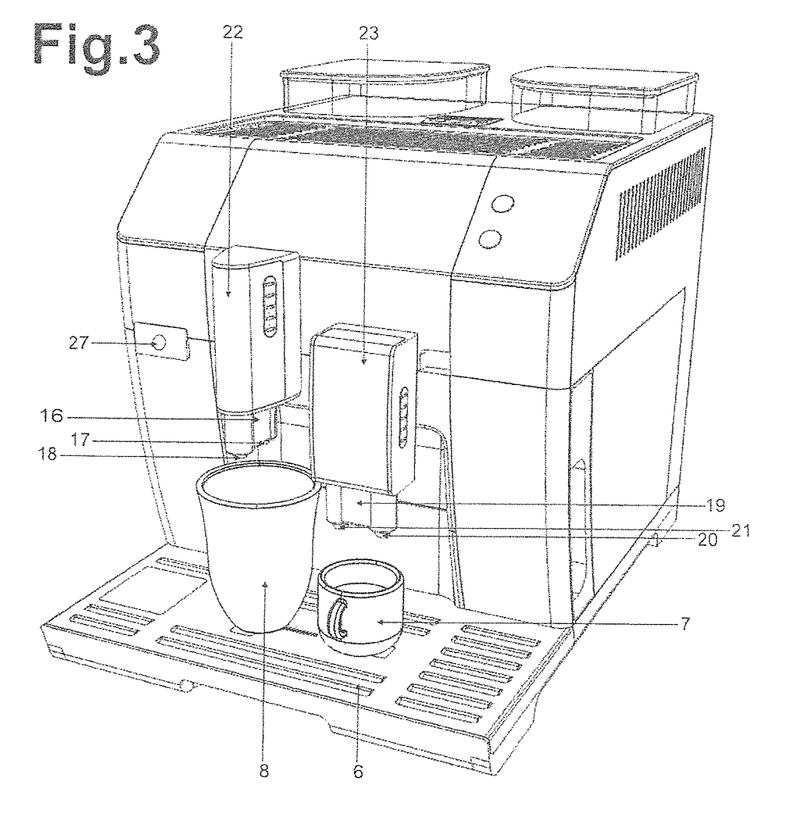
FIG. 3 shows the machine in the suitable configuration for the simultaneous preparation of two coffees of different lengths.

To simultaneously prepare with a single infusion two different coffee drinks (FIG. 3), for example an espresso or ristretto and a long coffee drink, the user positions a short cup 7 below the dispensing unit 19 and a tall cup 8 below the dispensing unit 16 so that the axial extension of the nozzles 20, 21 and 17, 18 respectively projects into the mouth of the cup 7 and 8 respectively, and performs the selection on the programming unit 39; at this point the control unit 14 controls the full loading of the infuser unit 2, the closure of the infusion unit 2, the activation of the pump 12 and of the boiler 13 for supplying a pre-established quantity of hot water to the infusion unit 2, and the simultaneous opening of the valve 37 and the valve 36 which is however kept open for a longer time to allow the extra infusion for the production of the long coffee drink.

Figure 2:
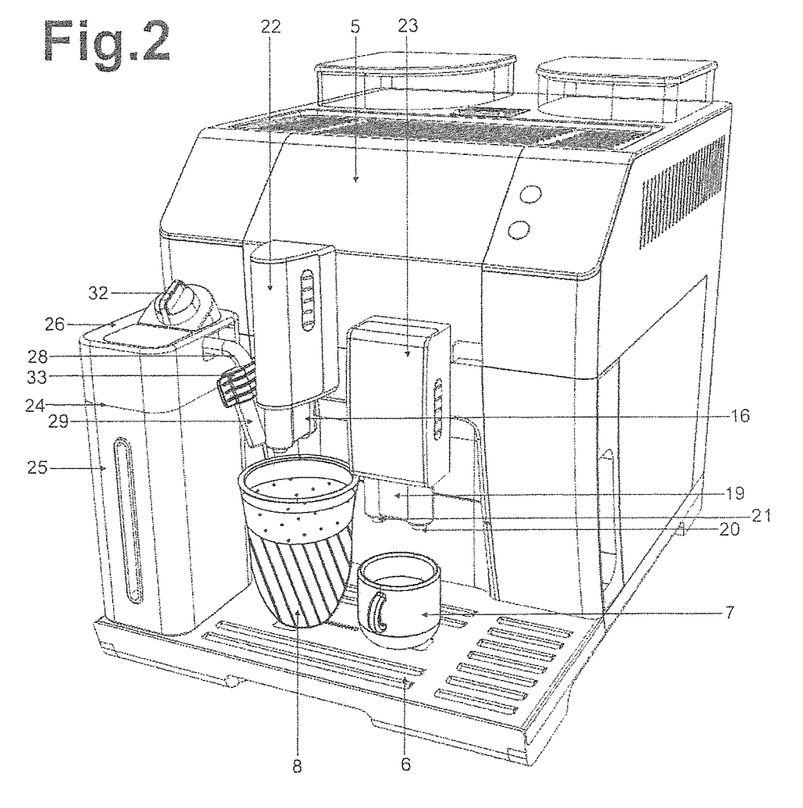
FIG. 2 shows the machine in a suitable configuration for the simultaneous preparation of a coffee and a milk and coffee based drink.

To prepare simultaneously with a single infusion a coffee drink and a coffee and milk based drink (FIG. 2), the user connects the device 24 to the machine 1, positions a low cup 7 below the dispensing unit 19 and a tall cup 8 below the dispensing unit 16 so that the axial extension of the nozzles 20, 21 and 17, 18 respectively projects into the mouth of the cup 7 and 8, respectively, and the axial extension of the nozzles 30, 31 projects into the mouth of the cup 8. The user at this point performs the selection on the programming unit 39; the control unit 14 controls the full loading of the infuser unit 2, the closure of the infusion unit 2, the activation of the pump 12 and of the boiler 13 for the supply of a pre-established quantity of hot water to the infusion unit 2, the activation of the vapour production circuit made available to the dispenser 27, and the simultaneous opening and for the same interval of time of the valve 37 and the valve 36. In the cup 8 the coffee drink dispensed by the dispenser 16 is collected and the potentially frothy hot milk drink dispensed by the dispenser 29, whereas in the cup 7 the coffee drink is collected.

The machine 1 can however be programmed to operate with two consecutive infusions for the preparation of four of the same or different drinks.

Figure 4:
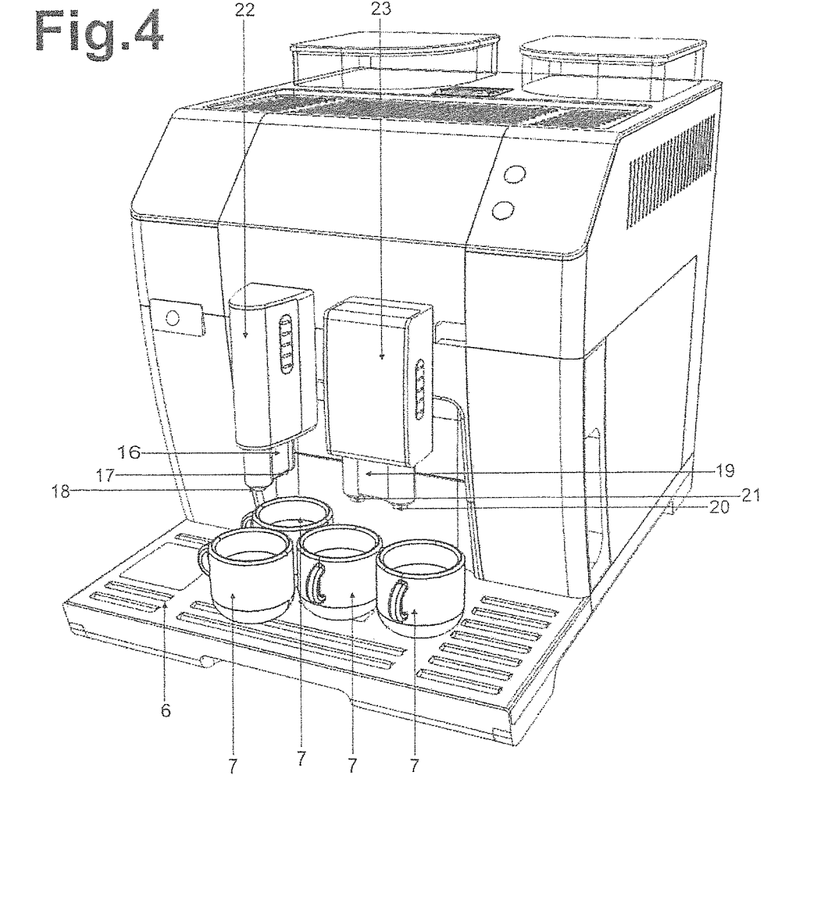
FIG. 4 shows the machine in the suitable configuration for the simultaneous preparation of four coffees of the same type.

To prepare four of the same coffee drinks with two consecutive infusions (FIG. 4), the user positions two cups 7 below the dispensing unit 19 and two cups 7 below the dispensing unit 16 so that the axial extension of each nozzle 17, 18, 20, 21 projects into the mouth of a corresponding cup 7. In practice the two cups 7 placed below the dispensing unit 16 are aligned along the alignment direction L1, whereas the two cups 7 placed below the dispensing unit 19 are aligned along the alignment direction L2. The user at this point performs the selection on the programming unit 39; the control unit 14 controls, for each infusion cycle, the full loading of the infuser unit 2, the closure of the infusion unit 2, the activation of the pump 12 and of the boiler 13 for the supply of a pre-established quantity of hot water to the infusion unit 2, and the selective opening of just one of the valves 36, 37. In the second infusion cycle, the opening of the valve that remained closed in the first infusion cycle is controlled in particular. The valves 36, 37 remain open for the same amount of time in the respective infusion cycles.

Figure 5:
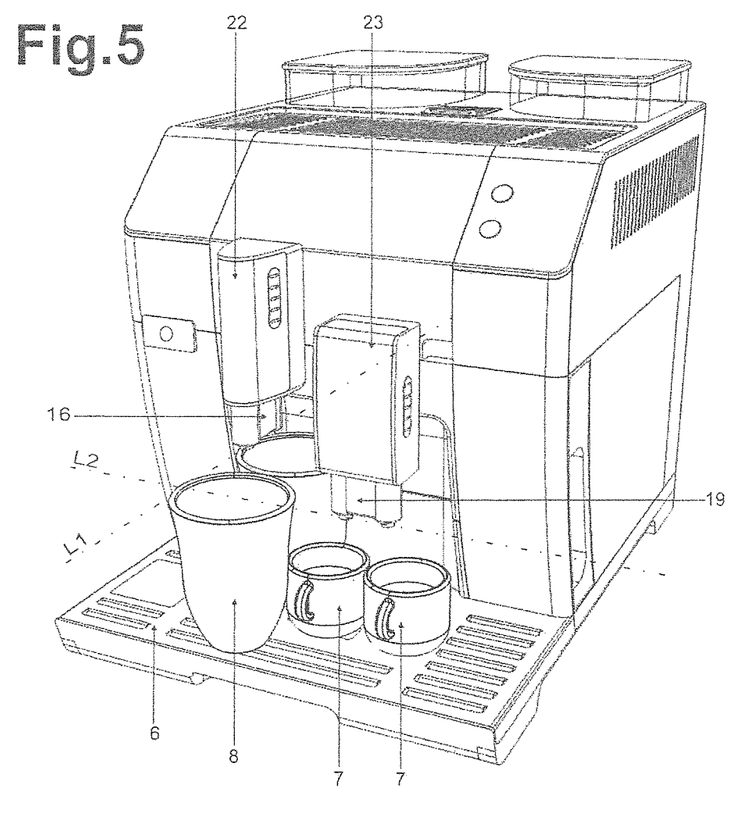
FIG. 5 shows the machine in a suitable configuration for the simultaneous preparation of four different coffees in pairs.

To prepare with two consecutive infusions four different coffee drinks, in particular two ristretto or espresso drinks and two long coffee drinks (FIG. 5), the user positions a first and a second low cup 7 below the dispensing unit 19 and a first and a second tall cup 8 below the dispensing unit 16 so that the axial extension of the nozzle 20 and of the nozzle 21 respectively projects into the mouth of the first low cup 7 and respectively of the second low cup 7, and the axial extension of the nozzle 17 and of the nozzle 18 respectively projects into the mouth of the first tall cup 8 and of the second tall cup 8 respectively. In practice the two cups 8 placed below the dispensing unit 16 are aligned along the alignment direction L1, while the two cups 7 placed below the dispensing unit 19 are aligned along the alignment direction L2. The user at this point performs the selection on the programming unit 39; the control unit 14 controls, for each infusion cycle, the full loading of the infuser unit 2, the closure of the infusion unit 2, the activation of the pump 12 and of the boiler 13 for the supply of a pre-established quantity of hot water to the infusion unit 2, and the selective opening of just one of the valves 36, 37. In the second infusion cycle, the opening of the valve that remained closed in the first infusion cycle is controlled in particular. The valve 36, serving the dispenser 16, remains open for a longer amount of time in order to allow the extra infusion needed for producing longer coffee drinks.

Figure 6:
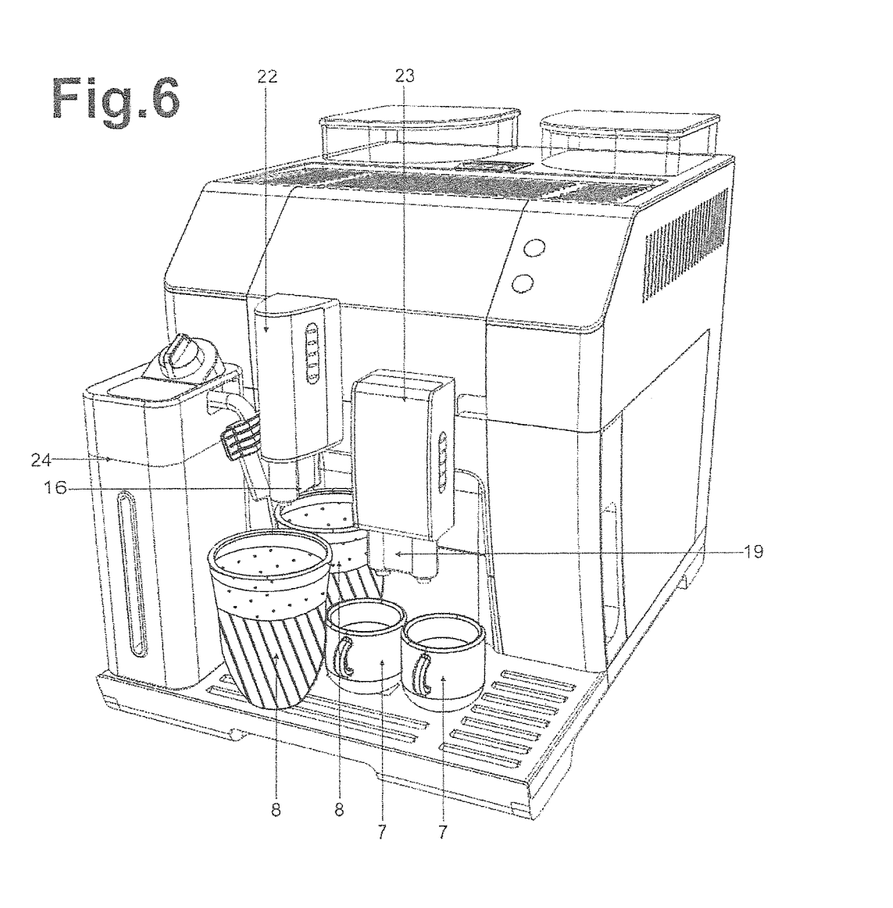
FIG. 6 shows the machine in a suitable configuration for the simultaneous preparation of two coffees and two milk and coffee based drinks.

To prepare with two consecutive infusions two coffee based drinks and two coffee and milk based drinks (FIG. 6), the user connects the device 24 to the machine 1, and positions a first and a second low cup 7 below the dispensing unit 19 and a first and a second tall cup 8 below the dispensing unit 16 so that the axial extension of the nozzle 20 and of the nozzle 21 respectively projects into the mouth of the first low cup 7 and of the second low cup 7 respectively, the axial extension of the nozzle 17 and of the nozzle 30 project into the mouth of the first tall cup 8, and the axial extension of the nozzle 18 and the nozzle 31 project into the mouth of the second tall cup 8. In practice the two cups 8 placed below the dispensing unit 16 are aligned along the alignment direction L1, while the two cups 7 placed below the dispensing unit 19 are aligned along the alignment direction L2. The user at this point performs the selection on the programming unit 39; the control unit 14 controls, for the first infusion cycle, the full loading of the infuser unit 2, the closure of the infusion unit 2, the activation of the pump 12 and of the boiler 13 for the supply of a pre-established quantity of hot water to the infusion unit 2, and the selective opening of the valve 37 alone. The coffee drink is collected in the cups 7. In the second infusion cycle, in particular the opening of the valve 36 is controlled, which remains closed in the first infusion cycle, and the activation of the vapour production circuit is also controlled made available to the dispenser 27. Both the coffee drink dispensed by the dispenser 16 and the potentially frothy hot milk dispensed by the dispenser 29 are automatically conveyed into each cup 8. Such drinks therefore combine to produce the milk and coffee drink.

Naturally the programming of the machine operation may be different from that illustrated now which is preferable if opting for a construction of the machine 1 which exploits components, including the infuser, already commonly available on the market.

It is equally possible to contemplate the use of a non-standard infuser having a higher maximum production capacity with a sole infusion cycle, equal, for example, to four drinks, and to pilot the interception valves differently in order to have with one single infusion cycle the simultaneous production of four coffee based and/or milk and coffee based drinks, which may be in different pairs.

One of the main advantages of the machine is constituted by is compactness and ergonomics due to the special location and arrangement of the dispensing units in combination with the provision of a single infuser unit which overall make the machine simple from a construction point of view and consequently cheap but extremely productive and flexibly adaptable for the preparation of personalised drinks and for the simultaneous use by various users.

The control of the distribution downstream of the infuser with pipe-clamping valves further guarantees the maintenance of a high standard of hygiene and easier access for the maintenance and cleaning of the internal components of the machine.

Among the possible variations of the invention the main one relates to the arrangement and orientation of the dispensing nozzles of the coffee and milk: in fact, in other applications falling within the scope of the present invention the directions L1 and L2 may coincide or be parallel and oriented along the direction of the width or depth of the machine.

Likewise, the dispensing direction of the milk dispensing nozzles is not necessarily rectilinear and inclined with respect to the support surface of the cups but may be oriented vertically or inclined; the distance between the milk dispensing nozzles and the coffee infusion dispensing nozzles may also not necessarily be the same, as long as they can still be centred within the cups(s) below.

The coffee machine as conceived herein is susceptible to many modifications and variations, all falling within the scope of the invented concept; furthermore, all the details are replaceable by technically equivalent elements.

The materials used, as well as the dimensions, may in practice be of any type according to requirements and the state of the art.

The invention claimed is:

1. A highly flexible use automatic coffee machine for producing coffee and/or milk-based drinks, comprising:
   a single coffee infuser unit;
   a coffee infusion dispenser located in front of a front wall of the coffee machine in a distanced position above a support surface for resting multiple cups for collecting coffee infusion, the coffee infusion dispenser comprising a first and a second coffee infusion dispensing unit, each coffee infusion dispensing unit comprising at least two coffee infusion dispensing nozzles;
   a hydraulic circuit that makes the coffee infusion and distributes the coffee infusion to the coffee infusion dispenser, where the hydraulic circuit includes, in serial order, a water tank, a water circulation pump, a water boiler, the single coffee infuser unit, and the coffee infusion dispenser;
   a milk heating and frothing device located in front of the front wall, having at least one milk dispensing unit equipped with a first and a second milk dispensing nozzle located in a distanced position above the support surface;
   wherein, downstream of the single coffee infuser unit, the hydraulic circuit comprises a first supply pipe directed from the single coffee infuser unit to the first coffee infusion dispensing unit and a second supply pipe directed from the single coffee infuser unit to the second coffee infusion dispensing unit; where the first supply pipe includes a first valve, fluidly communicating with the single coffee infuser unit and located between the single coffee infuser unit and the first coffee infusion dispensing unit, that intercepts flow of the coffee infusion to the first coffee infusion dispensing unit along the first supply pipe, and where the second supply pipe includes a second valve, fluidly communicating with the single coffee infuser unit and located between the single coffee infuser unit and the second coffee infusion dispensing unit, that intercepts flow of the coffee infusion to the second coffee infusion dispensing unit along the second supply pipe;
   wherein said first coffee infusion dispensing unit and said second coffee infusion dispensing unit are each independently and communicatively supported by, and relative to, the coffee machine, where a support for each of the first and the second coffee infusion dispensing unit provides for independent height adjustment of each of the first and the second coffee infusion dispensing unit relative to the support surface.

2. The highly flexible use automatic coffee machine according to claim 1, wherein the milk heating and frothing device is removable and is located on the support surface.

3. The highly flexible use automatic coffee machine according to claim 1, wherein the coffee infusion dispensing nozzles and the milk dispensing nozzles are directed towards a space below the first coffee infusion dispensing unit.

4. The highly flexible use automatic coffee machine according to claim 1, wherein said first and said second supply pipes are hoses, and said first and said second interception valves are pipe-clamping valves.

5. The highly flexible use automatic coffee machine according to claim 1, wherein said first and said second coffee infusion dispensing nozzles are fixed to a first single support, said third and said fourth coffee infusion dispensing nozzles are fixed to a second single support, and said first and said second milk dispensing nozzles are fixed to a third single support.

6. The highly flexible use automatic coffee machine according to claim 5, wherein said first single support of said first and second coffee infusion dispensing nozzles has an internal channel configured to equally distribute flow of the coffee infusion between said first and said second coffee infusion dispensing nozzles, wherein said second single support of said third and said fourth coffee infusion dispensing nozzles has an internal channel configured to equally distribute flow of the coffee infusion between said third and said fourth coffee infusion dispensing nozzles, and wherein said third single support of said first and said second milk dispensing nozzles has an internal channel configured to equally distribute flow of milk between said first and said second milk dispensing nozzles.

7. The highly flexible use automatic coffee machine according to claim 1, wherein the at least two coffee infusion dispensing nozzles of the first coffee infusion dispensing unit are aligned along a first alignment direction, and the at least two coffee infusion dispensing nozzles of the second coffee infusion dispensing unit are aligned along a second alignment direction transverse to said first alignment direction.

8. The highly flexible use automatic coffee machine according to claim 7, wherein said first alignment direction develops parallel to a direction of a depth axis of the coffee machine, and said second alignment direction develops in a direction of a width axis of the coffee machine.

9. The highly flexible use automatic coffee machine according to claim 8, wherein said first and said second milk dispensing nozzles are separated by an established distance and aligned along a third alignment direction parallel to said first alignment direction.

10. The highly flexible use automatic coffee machine according to claim 7, wherein the at least two coffee infusion dispensing nozzles of each of the first and the second coffee infusion dispensing units have a straight dispensing axis at right angles to the support surface of the cups, and said first and said second milk dispensing nozzles have a straight dispensing axis inclined with respect to the support surface of the cups.

11. The highly flexible use automatic coffee machine according to claim 10, wherein dispensing tips of each of the at least two coffee infusion dispensing nozzles of the first coffee infusion dispensing unit and the dispensing tips of the first and the second milk dispensing nozzles are arranged in a single lying plane parallel to, and at a first height relative to, the support surface, and the dispensing tips of each of the at least two coffee infusion dispensing nozzles of the second coffee infusion dispensing unit are arranged in a single lying plane parallel to, and at a second height, different than the first height, relative to, the support surface.

12. A highly flexible use automatic coffee machine for producing coffee and/or milk-based drinks, comprising: a single coffee infuser unit; a coffee infusion dispenser located in front of a front wall of the coffee machine in a distanced position above a support surface for resting multiple cups for collecting coffee infusion, the coffee infusion dispenser comprising a first and a second coffee infusion dispensing unit; a hydraulic circuit that distributes the coffee infusion from the single coffee infuser unit to the coffee infusion dispenser; wherein the first and the second coffee infusion dispensing units are each equipped with at least one coffee infusion dispensing nozzle; where the hydraulic circuit comprises a first supply pipe directed from the single coffee infuser unit to the first coffee infusion dispensing unit and a second supply pipe directed from the single coffee infuser unit to the second coffee infusion dispensing unit; where the first supply pipe includes a first valve, connected to and located after the single coffee infuser unit, that intercepts flow of the coffee infusion to the first coffee infusion dispensing unit along the first supply pipe, and where the second supply pipe includes a second valve, connected to and located after the single coffee infuser unit, that intercepts flow of the coffee infusion to the second coffee infusion dispensing unit along the second supply pipe,
wherein said first coffee infusion dispensing unit and said second coffee infusion dispensing unit are each independently and communicatively supported by, and relative to, the coffee machine, where a support for each of the first and the second coffee infusion dispensing unit provides for independent height adjustment of each of the first and the second coffee infusion dispensing unit relative to the support surface.

13. The highly flexible use automatic coffee machine according to claim 12, further comprising a milk heating and frothing device located in front of the front wall, having at least one milk dispensing unit equipped with a first and a second milk dispensing nozzle located in a distanced position above the support surface.

14. A highly flexible use automatic coffee machine for producing coffee and/or milk-based drinks, comprising: a single coffee infuser unit; a coffee infusion dispenser located in front of a front wall of the coffee machine in a distanced position above a support surface for resting multiple cups for collecting coffee infusion, the coffee infusion dispenser comprising a first and a second coffee infusion dispensing unit, each coffee infusion dispensing unit comprising at least two coffee infusion dispensing nozzles; a hydraulic circuit that makes the coffee infusion and distributes the coffee infusion to the coffee infusion dispenser, where the hydraulic circuit includes, in serial order, a water tank, a water circulation pump, a water boiler, the single coffee infuser unit, and the coffee infusion dispenser; a milk heating and frothing device located in front of the front wall, having at least one milk dispensing unit equipped with a first and a second milk dispensing nozzle located in a distanced position above the support surface; wherein, downstream of the single coffee infuser unit, the hydraulic circuit comprises a first supply pipe directed from the single coffee infuser unit to the first coffee infusion dispensing unit and a second supply pipe directed from the single coffee infuser unit to the second coffee infusion dispensing unit; where the first supply pipe includes a first valve, fluidly communicating with the single coffee infuser unit and located between the single coffee infuser unit and the first coffee infusion dispensing unit, that intercepts flow of the coffee infusion to the first coffee infusion dispensing unit along the first supply pipe, and where the second supply pipe includes a second valve, fluidly communicating with the single coffee infuser unit and located between the single coffee infuser unit and the second coffee infusion dispensing unit, that intercepts flow of the coffee infusion to the second coffee infusion dispensing unit along the second supply pipe, wherein, the at least two coffee infusion dispensing nozzles of the first coffee infusion dispensing unit are fixed to, and extend from, the first coffee infusion dispensing unit in a first alignment direction developing parallel to a direction of a depth axis of the coffee machine, the at least two coffee infusion dispensing nozzles of the second coffee infusion dispensing unit are fixed to, and extend from, the second coffee infusion dispensing unit in a second alignment direction developing parallel to a direction of a width axis of the coffee machine, and the first and the second milk dispensing nozzles of the at least one milk dispensing unit are fixed to, and extend from, the at least one milk dispensing unit in the first alignment direction, parallel to the at least two coffee infusion dispensing nozzles of the first coffee infusion dispensing unit;
wherein said first coffee infusion dispensing unit and said second coffee infusion dispensing unit are each independently and communicatively supported by, and relative to, the coffee machine, where a support for each of the first and the second coffee infusion dispensing unit provides for independent height adjustment of each of the first and the second coffee infusion dispensing unit relative to the support surface.

15. The highly flexible use automatic coffee machine according to claim 14, wherein dispensing tips of each of the at least two coffee infusion dispensing nozzles of the first coffee infusion dispensing unit and the dispensing tips of the first and the second milk dispensing nozzles are arranged in a single lying plane parallel to, and at a first height, relative to the support surface, and the dispensing tips of each of the at least two coffee infusion dispensing nozzles of the second coffee infusion dispensing unit are arranged in a single lying plane parallel to, and at a second height, different than the first height, relative to the support surface.

16. The highly flexible use automatic coffee machine according to claim 15, wherein:
the first coffee infusion dispensing unit is communicatively supported to the front wall of the coffee machine by a first, single, vertically slidable support cantilevered in front of the front wall of the coffee machine, and the second coffee infusion dispensing unit is communicatively supported to the front wall of the coffee machine by a second, single, vertically slidable support cantilevered in front of the front wall of the coffee machine, where the first and the second supports are independently adjustable in position to raise and lower the height of the first and the second coffee infusion dispensing units relative to the support surface; and the first and the second milk dispensing nozzles, aligned in the first alignment direction, are each immediately adjacent, in the second alignment direction, to a respective coffee infusion dispensing nozzle of the first coffee infusion dispensing unit, the first and the second milk dispensing nozzles being located on a side of the first coffee infusion dispensing unit, in the second alignment direction, opposite the second coffee infusion dispensing unit.

* * * * *